Figure 1:
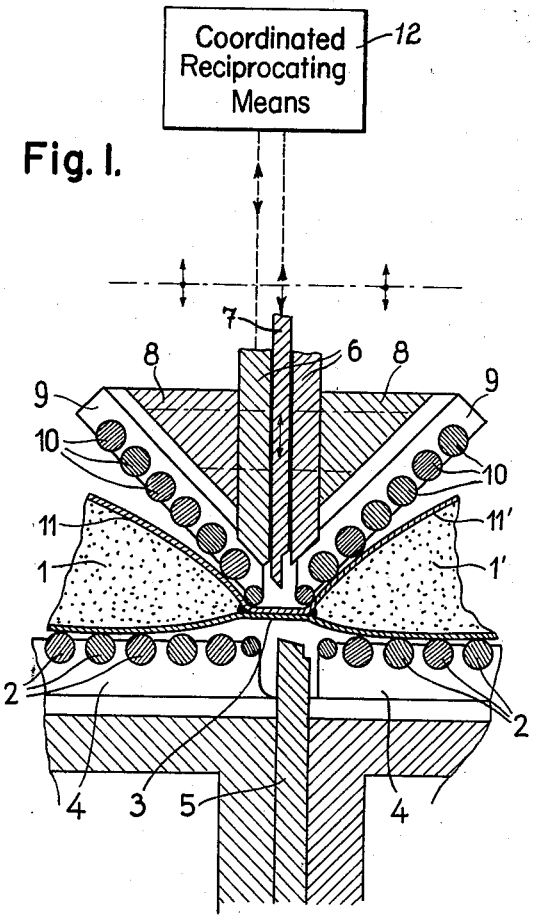

Nov. 7, 1961  H. LANG ET AL  3,007,359
APPARATUS FOR ALIGNING AND SEPARATING FROM ONE ANOTHER
CONTINUOUS, PILLOW-SHAPED PACKAGES
Filed June 25, 1957

INVENTORS
HELMUT LANG
GUSTL LOWINGER
BY Connolly and Hutz
their ATTORNEYS

United States Patent Office 3,007,359
Patented Nov. 7, 1961

3,007,359
APPARATUS FOR ALIGNING AND SEPARATING FROM ONE ANOTHER CONTINUOUS, PILLOW-SHAPED PACKAGES
Helmut Lang, Siegsdorf-Wernleiten, Oberbayern, and Gustl Lowinger, Bad Reichenhall, Germany, assignors to Farbwerke Hoechst Aktiengesellschaft vormals Meister Lucius & Brüning, Frankfurt am Main, Germany, a corporation of Germany
Filed June 25, 1957, Ser. No. 667,786
Claims priority, application Germany June 30, 1956
6 Claims. (Cl. 83—175)

The object of the invention is a process for separating from one another continuous, pillow-shaped packages charged with a product, which are subdivided by welded seams, the cover of these packages consisting of sheet material, especially plastics, and a device by means of which the packages are separated from one another, preferably in an automatic manner.

Pillow-shaped packages containing a product are in general fabricated such that a tube of thermoplastic artificial material charged with the product to be packed is sealed at regular intervals so that pillow-shaped packages are formed which are still connected with one another and are then separated by welded seams. This separating operation was hitherto carried out by hand in such a manner that two packages held by both hands, together with the welded seam subdividing these packages, are moved towards a rotating separating disk, the welded seams being intersected approximately in the center. This method has the considerable disadvantage that it is most uneconomical since the process of separating the package is extraordinarily time-consuming and expensive.

According to the process of the invention, the welded seam between two packages, prior to being intersected, is mechanically stretched by means of straightening organs, then straightened and centered with respect to the cutting edge of the blade so that the blade can intersect the welded seam approximately along the center line.

Areas of pressure inclined in the form of wedges are used in order to stretch, straighten and center the welded seam. These areas of pressure act upon the arcuate walls of the pillow-shaped packages in a direction parallel to the welded seams to be intersected; they are arranged opposite to the bearing surfaces for the packages. According to this arrangement, one part of the cutting device is situated between the wedge-shaped areas of pressure and the other part between the bearing or supporting surfaces. Since especially plastic sheets have an extraordinarily high coefficient of friction and do not slide owing to the adhesion of the surfaces of the packages to the smooth, wedge-shaped pressure areas, these wedge-shaped pressure areas, according to the invention, consist of a plurality of rolls which are closely situated to one another in a parallel direction and which can be easily pivoted.

The movement of the single parts of the device, that is the wedge-shaped areas of pressure and/or the horizontal or approximately horizontal bearing surfaces can in any desired way be adapted to the individual conditions prevailing, that is to say, it is possible to move the wedge-shaped areas of pressure either towards the bearing- or supporting surfaces or vice versa; it is likewise possible to arrange the movable cutting blade either between the two wedge-shaped pressure areas or between the two parts of the bearing surface. It is only essential that the movement of the elements effecting the stretching, straightening and centering of the welding seam anticipates the movement of the cutting blade.

Figure 2:
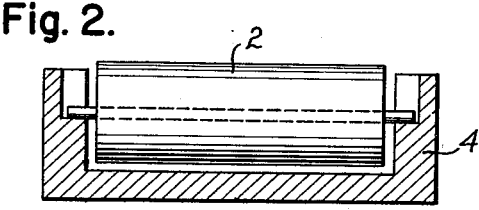

Novel features and advantages of the present invention will become apparent to one skilled in the art from a reading of the following description in conjunction with the accompanying drawings wherein similar reference characters refer to similar parts and in which:

FIG. 1 is a cross-sectional view in elevation taken through one embodiment of this invention; and FIG. 2 is a cross-sectional view of a bearing portion of the embodiment shown in FIG. 1.

The pillow-shaped packages 1, 1' etc. are guided over a horizontal supporting and bearing surface which consists of a plurality of small, parallelly arranged rolls 2 which are rotatably mounted with a portion of their sides adjacent packages 1, 1' exposed to contact these packages, the packages being guided according to the stroke of the welding machine with which the cutting device is advantageously coupled. Packages 1, 1' are always advanced by one subdivision, that is the interval of two welded seams 3 between packages 1 and 1'. The rolls 2 are on both sides rotatably mounted in support bars 4. Approximately in the center of the step bearing and the sliding surfaces for the packages formed by rolls 2 there is situated the lower blade 5. The rolls situated next to the cutting edge of this blade are as small as possible in order to keep the distance as small as possible.

Opposite to the approximately horizontal bearing- and supporting surface there is a device that can be moved in an upward and downward direction, consisting of blade guide 6 with cutting blade 7 arranged in the guide and of ledge 8 fastened to the blade guides, to whose surfaces, which are inclined towards one another approximately at an angle of 90°, deflecting bars 9 are fastened for pivoting rolls 10. The wedge-shaped upper areas of pressure; inclined towards one another approximately at an angle of 90°, are formed by rolls 10 which, when being moved downward towards welded seam 3 between the two packages 1 and 1', rest on the upper surfaces 11 and 11' thus exerting a pressure on both sides, so that thereby welded seam 3 is stretched, straightened and centered with respect to the cutting edge of blade 7. The pressure and cutting organs are reciprocated in the later described coordinated fashion by a coordinated reciprocating means which is schematically represented in the drawing by block 12. Reciprocating means 12 advantageously driven by the motive power of a packing machine for the continuous manufacture of packages charged with a product, with which the device for separating the packages from one another is advantageously coupled. In each single stage of the operation through coordinated reciprocating means 12 the pressure organ is first moved towards the welded seam between two packages and then the blade is moved in that direction so that it strikes the welded seam only after the latter has been stretched, straightened and centered. The coupling of these two movable parts is effected, for example, by means of a correspondingly adjusted pressure spring. However, it is just as well possible to regulate each of the two movable parts automatically and independently of one another.

We claim:

1. An apparatus for separating pillow-shaped packages formed upon a continuous filled tube subdivided at regular intervals by fused seams spacing said packages at predetermined distances from each other, said apparatus comprising a pair of opposed bearing elements between which said continuous tube is advanced in a longitudinal direction to dispose said fused seams successively between said opposed bearing elements, one of said opposed bearing elements being wedge-shaped and having a pair of bearing surfaces inclined towards each other at an angle, a portion of each of said bearing elements in line with the vertex of the angle formed by said inclined bearing surfaces being recessed to provide spaces in them, means for reciprocating said opposed bearing elements toward and away from each other for intermittently engaging said fused seams disposed between them, said spaces being substantially aligned with the direction of reciprocation of said bearing elements, cutting blade means mounted upon each of said bearing elements within said spaces, additional reciprocating means coordinated with said aforementioned reciprocating means, said additional reciprocating means being connected with one of said cutting blade means for causing said cutting blade means to move across each other through said seams after said opposed elements have been moved toward each other, the portions of said opposed bearing elements disposed adjacent the wall of said tube incorporating antifriction means for allowing said tube to move longitudinally relative to said bearing elements for aligning and holding said seams substantially in line with the vertex of said wedge-shaped element when said opposed surfaces are moved toward each other, and the distance across the tip of said wedge-shaped element adjacent the area where said space extends through it being substantially equal to said predetermined distances for allowing said tip to enter between said pillow-shaped packages for adjusting and holding said seams in line with said cutting blade means after said opposed elements have been moved toward each other.

2. An apparatus as set forth in claim 1 wherein said wedge-shaped surface is arranged at an angle of approximately 90°.

3. An apparatus as set forth in claim 1 wherein said antifriction means is comprised of rollers rotatably mounted parallel to each other within said opposed elements with their axes disposed substantially perpendicular to said longitudinal path of movement of said continuous tube.

4. An apparatus as set forth in claim 1 wherein said bearing element opposite said wedge-shaped element has a substantially flat surface.

5. An apparatus as set forth in claim 3 wherein a pair of rollers are mounted within said wedge-shaped element closely adjacent both sides of said space, and said pair of rollers being relatively smaller in diameter than said rollers disposed remote from said space for minimizing the width of said tip of said wedge-shaped surface.

6. An apparatus as set forth in claim 5 wherein another pair of rollers are mounted within said bearing element which is opposite said wedge-shaped bearing element closely adjacent to both sides of the space in it, and said other pair of rollers being relatively smaller in diameter than said rollers remote from said space.

References Cited in the file of this patent
UNITED STATES PATENTS

| | | |
|---|---|---|
| 990,026 | Zipper | Apr. 18, 1911 |
| 2,185,885 | Bruker | Jan. 2, 1940 |
| 2,747,346 | Tigerman et al. | May 29, 1956 |
| 2,765,605 | Brelsford et al. | Oct. 9, 1956 |
| 2,784,540 | Jarund | Mar. 12, 1957 |
| 2,866,501 | George | Dec. 30, 1958 |